March 31, 1953     J. R. BATTALINE     2,633,215

OVERLOAD RELEASE CLUTCH

Filed May 31, 1950     2 SHEETS—SHEET 1

INVENTOR.
JOHN R. BATTALINE
BY
Louis V. Lucia
ATTORNEY

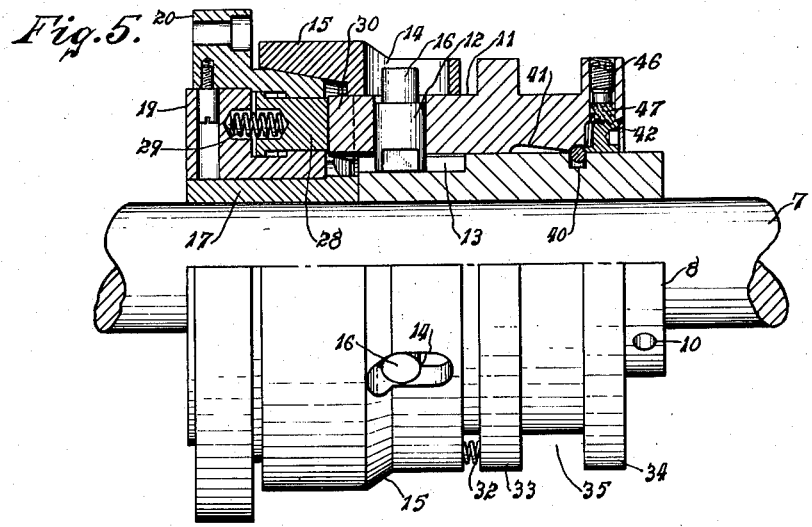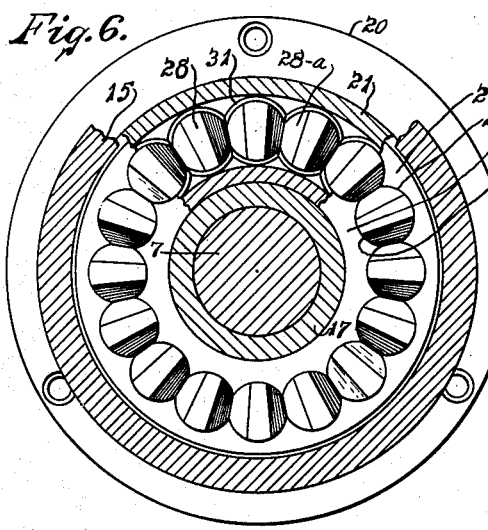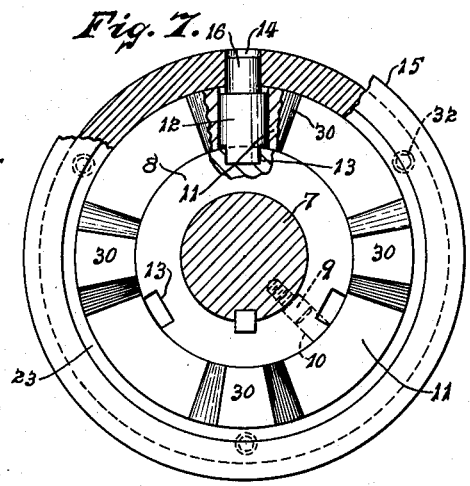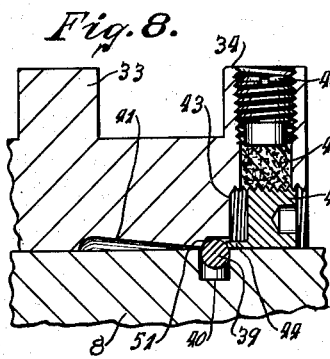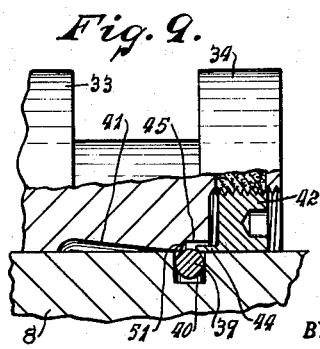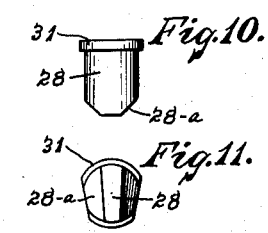

Patented Mar. 31, 1953

2,633,215

UNITED STATES PATENT OFFICE 2,633,215

OVERLOAD RELEASE CLUTCH

John R. Battaline, Hartford, Conn.

Application May 31, 1950, Serial No. 165,337

10 Claims. (Cl. 192—56)

This invention relates to overload release clutch and more particularly to such clutches as shown and described in my co-pending application Serial No. 29,989, filed May 29, 1948 and now abandoned.

An object of the present invention is to provide a clutch which is adapted to connect a driving member with a driven member, and apply a predetermined amount of torque to said driven member and to disconnect the said members upon the torque exceeding said amount when an overload is applied upon the driving member.

A further object of the invention is to provide means for adjusting the said clutch to automatically disconnect the driving and driven members when the torque applied through the clutch exceeds a predetermined degree.

A further object is the provision of a clutch having novel features of construction permitting economy in manufacture as well as increasing the efficiency of the clutch and simplifying the operation thereof.

Further objects and advantages of the present invention will be more clearly understood from the following description and from the accompanying drawings in which:

Fig. 5 is a side view, partly in central vertical section, showing the said clutch in fully engaged position.

Fig. 6 is an end view, partly in section on line 6—6 of Fig. 1.

Fig. 7 is an end view, partly in section, of one of the engaging members and the friction member which is moveable thereon.

Fig. 8 is an enlarged side view, in central vertical section, illustrating the operation of the adjustable releasing mechanism.

Fig. 9 is a substantially similar view showing a different adjustment of said mechanism.

Fig. 10 is a side view of one of the engaging plugs.

Fig. 11 is a front view thereof.

Figure 1:
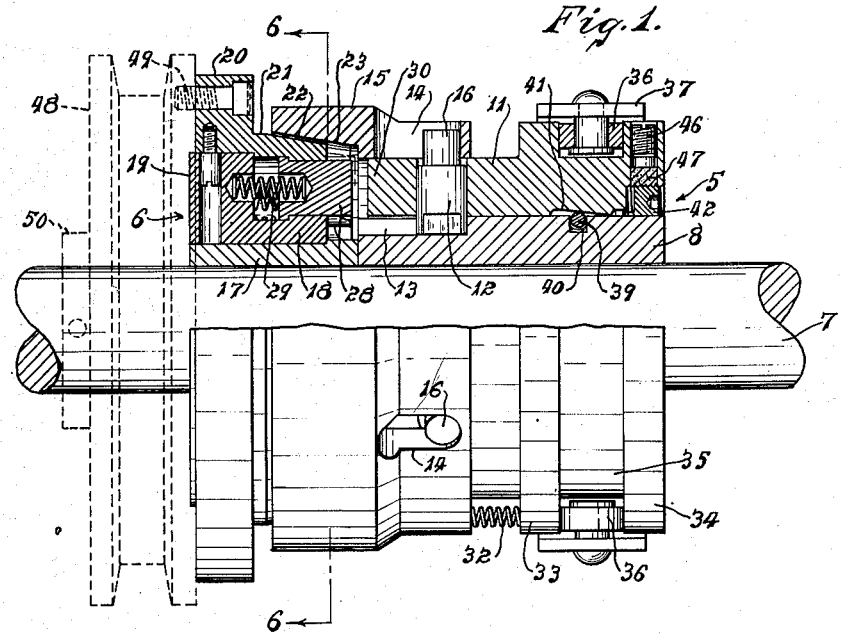
Fig. 1 is a side view, partly in central vertical section, of a clutch embodying the present invention, the said clutch being shown in disconnected position.

As shown in the drawings, my improved clutch comprises a pair of engageable units 5 and 6 which are mounted upon a drive shaft 7 that is driven by my improved clutch.

One of said units is fixed to the shaft, while the other unit is rotatable thereon. In the embodiment shown, the unit 5 includes an inner sleeve 8 which is secured to the shaft by means of a set screw 9 that is contained within an opening 10 in the sleeve 8 and is threaded to the shaft as shown in Fig. 7.

An operating sleeve 11 is slidably mounted on the said inner sleeve 8 and is secured against rotation thereon by means of pins 12, each of which is contained in a radial opening in the said sleeve and extends into a key slot 13 in the inner sleeve 8. The said pin also has a reduced portion which extends into a slot 14 in a friction ring 15, that is slidably mounted upon the said sleeve 11. The reduced portion of the pin 12 provides an abutment 16 which engages the edge portions of the slot 14 and retains the ring 15 in position on the sleeve 11. It will be noted that the said pins 12 slidably secure the sleeve 11 to the inner sleeve 8 and the friction ring 15 to the said sleeve 11.

The unit 6 includes a bushing 17 which is mounted upon the shaft 7 and carries a sleeve 18 that is rotatable with relation to the shaft. This sleeve has an annular flange 19 upon which is mounted a friction clutch ring 20 that has an annular flange 21 projecting therefrom with a tapered surface 22 that is adapted to engage a cooperating tapered surface 23 on the friction ring 15. The said sleeve 18 has an annular flange 24 with a series of notches 25 therein which are disposed on radial lines with a cooperating series of notches 26 on an annular flange 27 that projects inwardly from the annular flange 21. The opposed notches 25 and 26 form an annular row of connected openings which receive engaging plugs, or tumblers, 28 each of which is slabbed at the opposite sides thereof and on radial planes to provide abutment surfaces radiating from the axis of the clutch to thereby permit said tumblers 28 to be juxtapositioned between the cooperating notches 25 and 26 for sliding movement therein.

The tumblers 28 have curved surfaces between the said slabbed surfaces which fit within the opposed notches and thereby slidably secure the tumblers to the clutch unit for rotation therewith. Each of the said tumblers is urged outwardly from the unit 6 by means of a spring 29 which is provided between the tumbler and the flange 19 to force the tumbler outwardly in the unit so that it will project forwardly from the side of the unit, between the flange 27 and the flange 21, in position to be engaged by bosses 30 that project from the opposing side of the sleeve 11. Each of said tumblers is provided with a flange 31, at the inner end thereof, which engages the inner side of the flanges 24 and 27 to limit the outward movement of the tumblers.

The ring 15 is urged outwardly upon the sleeve 11 by means of a series of springs 32 which are positioned between the said ring and a flange 33 upon the sleeve 11. This flange, together with a cooperating flange 34, provides an intermediate groove 35 that receives rollers 36 on a yoke 37 of an operating lever (not shown). It will be noted that the sliding movement of the ring 15 on the sleeve 11, under the tension of the springs 32, is limited by engagement of the pins 12 with the ends of the slots 14, as shown in Fig. 1.

The sleeve 11 is retained in clutching position by means of a retaining member in the shape of a spring ring 39 which is contained within an annular groove 40 on the sleeve 8. This member is formed of a single piece of spring wire and has its ends separated to permit contraction thereof within the groove 40.

The inner surface of the sleeve 11 is provided with an annular groove 41 having a cam shaped bottom portion which contacts the outer periphery of the retaining spring ring 39. This cam shaped portion reduces resistance from the ring to the movement of the sleeve 11 and forces the said ring into the groove 40 when the sleeve is moved towards clutching position.

In order to adjust the clutch to disengage under different predetermined degrees of torque, I provide a torque adjustment ring 42 which is threaded to the internal wall of a recess 43 in the end of the sleeve 11 and has an inwardly extending annular flange 44 that extends into an annular recess 45 between the sleeves 8 and 11 and adjacent the outer edge of the annular groove 41. The said torque adjustment ring 42 is secured in adjusted position by means of a set screw 46 which forces a suitable soft plug 47 against the external threads of the adjustment ring and locks said ring in position to retain the adjustment thereof.

Figures 3, 4:
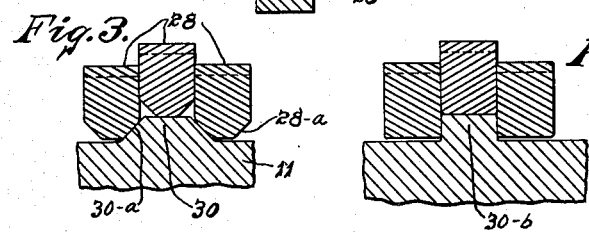
Figure 3 is an enlarged fragmental view illustrating the operation of the interengaging members of said clutch.
Fig. 4 is a similar view showing a modified form of said members.

From the illustration of Fig. 3, it will be noted that the sides of the bosses 30 are tapered, as at 30–a, and conform with the tapered corners 28–a of the engaging tumblers. This permits sliding movement between the two opposite units of the clutch as will be more fully hereinafter described.

In the modified form illustrated in Fig. 4, the tumblers and the engaging bosses are formed with straight side walls so as to provide a positive engagement between the two opposite clutch units.

As illustrated in dotted lines, in Fig. 1, the rotatable unit 6 may be driven by means of a suitable pulley 48, or the like, which is secured to the ring 20 by screws 49, and a collar 50 is fastened to the shaft 7 to secure the unit 6 against sliding movement thereon.

Figure 2:
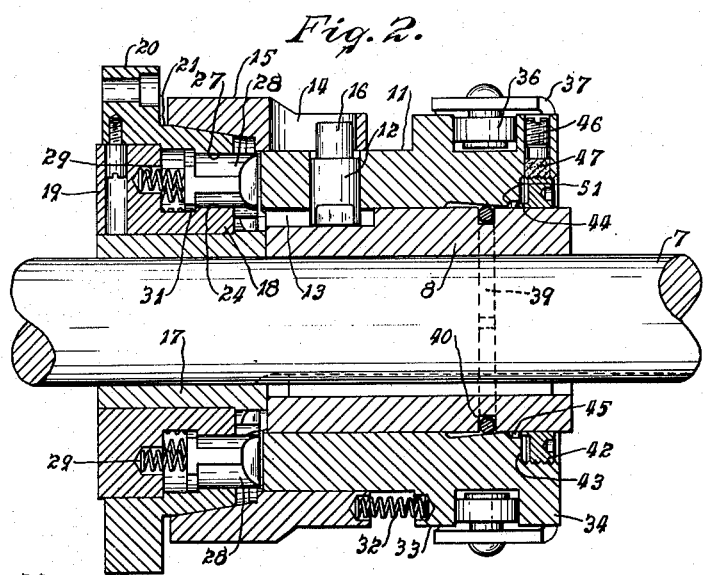
Fig. 2 is a side view, in central vertical section, showing the said clutch in partly engaged position.

The operation of my improved clutch is as follows:

When the clutch is in its disengaged position, as illustrated in Fig. 1, and it is desired to move it into engaged position, the yoke 37 is operated to slide the sleeve 11 in the direction of the unit 6 and thereby cause engagement between the tapered surfaces 22 and 23 of the ring 15 and the flange 21, respectively, as illustrated in Fig. 2 of the drawings. This will provide sufficient frictional engagement under the tension of the springs 32 to start rotation of the shaft 7 through the member 5 which is secured thereto.

On further movement of the operating lever, the sleeve 11 is moved into the clutched position illustrated in Fig. 5, wherein the bosses 30 on said sleeve will take the position illustrated in Fig. 3 from which it will be noted that the opposite tapered sides of the bosses are in engagement with the opposed tapered sides of two alternate tumblers, while the intermediate tumbler is retracted against the tension of its spring 29 and engages the outer end of the boss 30. This provides full clutching engagement between the two units of the clutch and applies the power from the pulley 48 to the shaft 7 through the said tumblers and bosses while the frictional engagement between the flange 21 and ring 15 is also maintained under the tension of the springs 32.

It will be noted that, as the sleeve 11 is moved towards clutching position, the retaining spring ring 39 is compressed by the cam surface portion 41 and then allowed to expand against the retaining shoulder 51, which is formed by the annular notch 45, and thereby retain the sleeve 11 in clutched position upon the sleeve 8 and the units 5 and 6 of the clutch in the engaged position shown in Fig. 5.

When an excessive load, which increases the torque beyond the predetermined limit for which the clutch has been adjusted, is applied upon the shaft 7, the bosses 30 will tend to move with relation to the tumblers 28 and the tapered sides of said bosses will force rearwardly, against the tension of the springs 29, the tumblers which are adjacent to the retracted tumblers in the direction of the relative movement so that the tension of an additional spring 29 will be applied against each of the bosses on the sleeve 11 and urge it towards disengaged position. This added tension will overcome the tension of the retaining spring 39 and cause it to contract under the pressure from the shoulder 51 and thereby release the said sleeve 11 and permit the clutch to become disengaged.

It will be understood that, when the clutch is disengaged, the sleeve 11 may be returned to its rearward position, illustrated in Fig. 1, by means of a suitable spring, not shown, which will cause the operating lever 38 to move the sleeve 11 into said position which is determined by engagement between the pins 12 and the ends of the slots 14.

My improved clutch may be adjusted for a predetermined torque at which it shall become disengaged by rotating the adjusting ring 42. When the said ring is rotated to increase the space between the edge of the flange 44 and the shoulder 51, the retaining spring ring 39 will expand further into the recess 45 to a position, as illustrated in Fig. 8, wherein the edge of the shoulder 51 is nearer the plane of the horizontal axis of the said retaining spring so that a greater amount of force is required to cause said retaining spring to contract and thereby release the clutch. When the said adjusting ring is adjusted to position the edge of the flange 44 closer to the edge of the shoulder 51, as illustrated in Fig. 9, the retaining spring ring will expand beyond the said edge of the shoulder 51 for a lesser distance so that the latter edge will be nearer to the vertical axis of said retaining ring and increased camming action is provided which will proportionately reduce the amount of force required to contract the said retaining ring. This will cause the clutch to become disengaged upon the application of the lesser degree of torque than when the clutch is adjusted as in Fig. 8.

From the above description, it will be clearly understood that the retaining ring 39 provides sufficient tension to retain the clutch in engaged position until the torque applied through the clutch reaches the limit for which the clutch has been adjusted. When the torque exceeds the said limit, a slippage will be caused between the opposite units of the clutch and the added tension, which is applied against the retaining spring ring by the tensioning of the springs 29 of the additional tumblers 28 which are forced rearwardly by the relative movement between the bosses 30 and the said tumblers that is caused by said slippage, will overcome the tension of the retaining spring ring against the shoulder 51 and cause said retaining ring to be contracted into the slot 40 and thereby release the sleeve 11 and cause disengagement of the clutch.

My improved clutch has been found highly successful in its operation for gradually causing the driven shaft to pick up speed before the clutch is moved to its fully engaged position so that a smooth clutching operation is performed. It has also been found that the said clutch will operate to maintain engagement under very heavy loads before becoming disengaged and that it may be adjusted to become disengaged with a high degree of uniformity when a predetermined limit of torque has been reached.

If desired, the overload release of the clutch may be omitted, so as to provide a positive engagement through said clutch, by simply modifying the shape of the bosses 30 and the tumblers 28 into the form illustrated in Fig. 4. When in this form, a positive connection will be provided by the engagement of a flat side of the boss 30-b with the straight side of the contacting tumbler and this connection will be maintained until the sleeve 11 is moved rearwardly by the operation of the yoke 37.

I claim:

1. A clutch comprising a driving unit, a driven unit, a plurality of plungers longitudinally slidable and juxtapositioned in an annular row in one of said units, a separate spring for urging each of said tumblers in position wherein it projects from the said unit, each of the tumblers having cooperating side surfaces disposed on radial planes and cylindrical side surfaces slidably fitting within conforming opposed notches in said unit whereby the annular row of tumblers is slidably secured to the unit to cause said tumblers to rotate with the unit, each of said tumblers having tapered side portions adjacent the projecting ends thereof, a plurality of projections upon the other unit adapted to intermesh with said tumblers and having tapered sides to interengage the tapered portions of the tumblers and thereby provide interengagement between the units of the clutch, the said bosses fitting between two alternate tumblers and being adapted to simultaneously engage the free ends of two tumblers in certain positions of the said projections relatively to the tumblers when slippage occurs between said units, and yieldable means for retaining the said members interengaged against the tension applied to each of said projections by a single one of said tumbler springs; the said retaining means being adapted to yield under the tension of two of said tumbler springs upon each one of the projections and thereby cause disengagement of said clutch units when a slippage occurs between the units.

2. A clutch comprising a driving unit, a driven unit, one of said units having an annular row of interconnected holes with their axes parallel to the axes of the unit, a longitudinally slidable tumbler contained in each of said holes, a spring urging each of said tumblers outwardly from said unit into position to be engaged, abutment means for limiting the outward movement of said tumblers, each of the tumblers having curved side surfaces engaging wall portions of said holes to prevent rotation of said annular row of plungers relatively to the unit and flat side surfaces in engagement with similar surfaces on adjacent tumblers to prevent rotation of each of the said tumblers about its axis, and a plurality of spaced projections upon the other of said units engageable with said tumblers for causing interengagement of said units.

3. A clutch for a shaft or the like comprising a driving unit, a driven unit, one of said units being rotatable upon the shaft and including a sleeve having an annular outwardly extending flange with a plurality of notches in the periphery thereof, a ring shaped member secured to said sleeve and having an inwardly extending annular flange opposed to the said outwardly extending flange of the sleeve and a plurality of notches in said inwardly extending flange cooperating with the notches in the flange of the sleeve to provide an annular row of interconnected recesses between said sleeve and ring shaped member, a tumbler slidably contained in each of said recesses, each of said tumblers having a circumferential portion fitting the notches and flat surfaces at opposite sides thereof on a plane radially disposed from the axis of the said member, a spring for each of said tumblers urging the tumbler outwardly from the member, and a plurality of spaced bosses upon the opposite unit engageable with said tumblers for providing interengagement between the said units.

4. A clutch having a driving unit, a driven unit, a plurality of tumblers projecting from one of said units and slidably moveable therein, a spring for each of said tumblers urging the tumbler outwardly from the said unit, the said tumblers being slidably contained between opposed notches having concave surfaces fitting convex surfaces of the tumblers and thereby preventing circumferential movement of the tumblers relatively to the unit in which they are contained, the other unit of said clutch having a sleeve slidable therein, means for securing said sleeve against rotation relatively to the unit, a plurality of spaced projections on said sleeve adapted to engage end portions of the said tumblers in the other unit to thereby cause interengagement of said units, means for moving said sleeve into position to cause engagement between said projections and tumblers, yieldable means engageable with said sleeve for retaining said engagement, the said retaining means being operative to permit disengagement between the said projections and tumblers upon a load of a predetermined torque being applied through said clutch, and means for adjusting said retaining means to cause release of the sleeve upon the application of loads of different degrees of torque.

5. A clutch as set forth in claim 4 wherein the retaining means includes a ring shaped spring member adapted to expand into engagement with said sleeve for retaining the projections thereon in engagement with the tumblers, and wherein the adjustment means are adapted to control the position of the ring shaped member with relation to the sleeve to thereby vary the amount of tension required to cause release of the sleeve.

6. A clutch as set forth in claim 4 wherein the sleeve is provided with an annular shoulder and the retaining member is a ring shaped spring adapted to expand into the path of said shoulder, and wherein the adjustment means is adapted to control the expansion of the spring to thereby vary the amount of torque required to provide sufficient tension against the said ring to cause contraction thereof for releasing the sleeve and permitting disengagement of the projections thereon from the tumblers.

7. A clutch comprising a driving unit, a driven unit, a plurality of projections on one of said units having tapered sides, an inner sleeve in the other unit, an outer sleeve slidable on the said inner sleeve and secured against rotation relatively thereto, a plurality of projections on said outer sleeve adapted to engage with the first-mentioned projections to cause interengagement of said units, means for moving said outer sleeve to cause said interengagement, retaining means including a tensioned member between the inner and outer sleeves adapted to retain the clutch in interengaged position, and adjustable means for positioning said tensioned member to cause operation thereof to release the outer sleeve and permit disengagement of the said units upon the application of a load of predetermined degree of torque through said clutch.

8. A clutch comprising a driving unit, a driven unit, a plurality of projections on one of said units having tapered engageable portions, the other of said units including an inner sleeve, an outer sleeve slidable upon the inner sleeve and rotatable therewith, projections on said outer sleeve adapted to engage the said tapered portions to provide interengagement between said units, and yieldable means for retaining said engagement; said retaining means comprising a ring shaped spring member contained within an annular groove within the exterior surface of the inner sleeve and adapted to expand into a position wherein it projects from said outer surface, an annular abutment on the said outer sleeve engageable with the projecting portion of said ring shaped member, and adjustable means including a ring threaded to said outer sleeve and having an annular flange extending therefrom in the direction of the said shoulder and adapted to be variably spaced from said shoulder to control the extent to which the said ring shaped spring will expand between said shoulder and flange and thereby vary the amount of tension required between said shoulder and ring to cause contraction of the ring into the anular groove for disengaging the shoulder and permitting movement of the outer sleeve and disengagement of the projections thereon from the said tapered portions.

9. A clutch as set forth in claim 8 wherein the outer sleeve is provided with means for retaining the annular flange in adjusted position with relation to the retainer engaging shoulder on said sleeve.

10. A clutch comprising the first unit, a second unit, the first unit having a plurality of tumblers slidable therein and juxtapositioned in an annular row around the axis of said unit, each of said plungers having tapered side portions adjacent the ends thereof and projecting from the unit, a separate spring for urging each of said tumblers in a projecting position, a second unit including an inner sleeve, an outer sleeve slidable on said inner sleeve and secured against rotation relatively thereto, a plurality of spaced projections on said outer sleeve having flat end portions adapted to engage the ends of the plungers and tapered side portions engageable with the tapered portions of said plungers, the front surface of each of said projections being of a width adapted to simultaneously engage the end surfaces of at least two adjacent tumblers and to fit between two alternate tumblers when in the normal engaging position whereby, when the said projections are in normal engagement with the tumblers, only one of said tumblers will be retracted against the tension of its spring, means for forcibly moving said outer sleeve to cause normal engagement of each of said projections thereon with one of said tumblers, and retaining means including a tensioned spring member contained within an annular groove in the exterior surface of the said inner sleeve; the said tensioned member being engageable with a retaining shoulder upon the outer sleeve and adapted to retain the said projections in engagement with the tumblers against the tension applied by one of said tumblers against each of said projections during the normal clutching engagement of said members; the said tensioning member being yieldable under the tension of two of said tumblers against each of said projections to permit release of the outer sleeve and disengagement of the said projections from the tumblers, and means for adjusting the position of said tensioned member to thereby decrease the amount of resistance applied by said member against the movement of the outer sleeve and vary the degree of torque required to cause disengagement of said outer sleeve by the tensioned member.

JOHN R. BATTALINE.

REFERENCES CITED

The following references are of record in the file of this patent:

UNITED STATES PATENTS

| Number | Name | Date |
|---|---|---|
| 776,404 | Keyser | Nov. 24, 1904 |
| 1,821,543 | Coultas | Sept. 1, 1931 |
| 2,128,715 | Reich | Aug. 30, 1938 |
| 2,554,740 | Jellis et al. | May 29, 1951 |

FOREIGN PATENTS

| Number | Country | Date |
|---|---|---|
| 108,515 | Great Britain | Aug. 7, 1917 |
| 203,731 | Great Britain | Sept. 10, 1923 |